(12) United States Patent
Charraud et al.

(10) Patent No.: US 12,394,098 B2
(45) Date of Patent: Aug. 19, 2025

(54) MULTI-CAMERA VIDEO CAPTURE FOR ACCURATE SKIN TONE MEASUREMENT

(71) Applicant: L'Oreal, Paris (FR)

(72) Inventors: Grégoire Charraud, Jersey City, NJ (US); Ji Lee, New York, NY (US); Shivya Bansal, Somerset, NJ (US)

(73) Assignee: L'Oreal, Paris (FR)

( * ) Notice: Subject to any disclaimer, the term of this patent is extended or adjusted under 35 U.S.C. 154(b) by 436 days.

(21) Appl. No.: 18/154,669

(22) Filed: Jan. 13, 2023

(65) Prior Publication Data

US 2024/0242384 A1    Jul. 18, 2024

(51) Int. Cl.
*G06T 7/90* (2017.01)
*G06T 3/00* (2024.01)
*G06T 3/16* (2024.01)

(52) U.S. Cl.
CPC ............... *G06T 7/90* (2017.01); *G06T 3/16* (2024.01); *G06T 2207/10016* (2013.01); *G06T 2207/10024* (2013.01); *G06T 2207/20081* (2013.01); *G06T 2207/30201* (2013.01)

(58) Field of Classification Search
CPC ... G06T 7/90; G06T 3/16; G06T 2207/10016; G06T 2207/10024; G06T 2207/20081; G06T 2207/30201
USPC ...................................................... 382/155
See application file for complete search history.

(56) References Cited

U.S. PATENT DOCUMENTS

| | | | |
|---|---|---|---|
| 10,469,714 B2* | 11/2019 | Rivard | H04N 23/56 |
| 10,643,375 B2* | 5/2020 | Rezaiifar | G06T 7/50 |
| 11,191,342 B2 | 12/2021 | Elfakhri et al. | |
| 2021/0406996 A1 | 12/2021 | Yu et al. | |
| 2022/0079325 A1 | 3/2022 | Elfakhri et al. | |

FOREIGN PATENT DOCUMENTS

KR    20190063210 A    6/2019

OTHER PUBLICATIONS

International Search Report and Written Opinion received in corresponding International Application No. PCT/US2024/011452, filed Jan. 12, 2024, mailed Mar. 4, 2024, 13 pages.

(Continued)

*Primary Examiner* — Quang N Vo
(74) *Attorney, Agent, or Firm* — CHRISTENSEN O'CONNOR JOHNSON KINDNESS PLLC

(57) ABSTRACT

A computing device obtains a first video recorded by a first camera (e.g., a rear-facing camera of a mobile computing device) having a first field of view in an illuminated environment and obtains a second video recorded by a second camera having a second field of view (e.g., a forward-facing camera of a mobile computing device) in the illuminated environment that differs from the first field of view. The second field of view is directed toward a face of a live subject. The computing device extracts lighting environment images from the first video and face images from the second video. The computing device processes the face images and the lighting environment images (e.g., using machine learning models) to obtain a plurality of determinations of skin tone of the face and combines the determinations of skin tone of the face to determine a combined determination of skin tone.

20 Claims, 6 Drawing Sheets

(56) References Cited

OTHER PUBLICATIONS

International Search Report and Written Opinion received in corresponding French Application No. 2303799, filed Apr. 17, 2023, mailed Dec. 4, 2023, 8 pages.
Partha Das, et al. "Color Constancy by GANs: An Experimental Survey," arXiv:1812.03085v1, Dec. 7, 2018: 11 pages.
Hassan A. Sial, et al. "Light Direction and Color Estimation from Single Image with Deep Regression," arXiv:2009.08941v1, Sep. 18, 2020, 5 pages.

* cited by examiner and ACCURATE SKIN TONE MEASUREMENT

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computing device performs a method of estimating skin tone based on face images, the method comprising obtaining a first video recorded by a first camera having a first field of view in an illuminated environment; obtaining a second video recorded by a second camera having a second field of view in the illuminated environment that differs from the first field of view, wherein the second field of view is directed toward a face of a live subject; extracting a plurality of lighting environment images from the first video; extracting a plurality of face images from the second video that include the face of the live subject; processing the face images and the lighting environment images to obtain a plurality of determinations of skin tone of the face; combining, by the computing device, the determinations of skin tone of the face to determine a combined determination of skin tone; and presenting the combined determination of skin tone. In some embodiments, the method further comprises constructing a panoramic image from the first video.

In some embodiments, processing the face images and the lighting environment images includes executing at least one machine learning model using the face images and the lighting environment images as input to generate the determinations of skin tone of the face as output. In some embodiments, this includes executing a first machine learning model using the face images and the lighting environment images as input to generate lighting condition information, such as illuminant color, for each of the face images as output; and executing a second machine learning model using the face images and the corresponding lighting condition information as input to generate the determinations of skin tone of the face as output.

In some embodiments, the determinations of skin tone are evaluated for suitability in further processing steps before being combined to obtain the combined determination of skin tone. In an illustrative scenario, the determinations of skin tone each include a corresponding confidence level. The computing device compares the corresponding confidence level with a threshold confidence level and omits the determination of skin tone from the combining step where the corresponding confidence level is less than the threshold confidence level.

In some embodiments, a system comprises a skin tone estimation unit including computational circuitry configured to obtain a first video recorded by a first camera having a first field of view in an illuminated environment; obtain a second video recorded by a second camera having a second field of view in the illuminated environment that differs from the first field of view, wherein the second field of view is directed toward a face of a live subject; extract a plurality of lighting environment images from the first video; extract a plurality of face images from the second video that include the face of the live subject; process the face images and the lighting environment images to obtain a plurality of determinations of skin tone of the face: combine the determinations of skin tone of the face to determine a combined determination of skin tone of the face: and present the combined determination of the skin tone of the face.

In some embodiments, the first camera is a rear-facing camera, and the computational circuitry is further configured to construct a panoramic image from the first video. In some embodiments, the computational circuitry is further configured to execute at least one machine learning model using the face images and the lighting environment images as input to generate the determinations of skin tone of the face as output.

In some embodiments, the computational circuitry is further configured to execute a first machine learning model using the face images and the lighting environment images as input to generate lighting condition information for each of the face images as output; and execute a second machine learning model using the face images and the corresponding lighting condition information as input to generate the determinations of skin tone of the face as output.

In some embodiments, a non-transitory computer-readable medium includes computer-executable instructions stored thereon that, in response to execution by one or more processors of a computer system, cause the computer system to perform actions comprising presenting a user interface on a mobile computing device instructing a user to capture a panoramic image in an illuminated environment; responsive to user input via the user interface, recording a first video with a rear-facing camera of the mobile computing device in the illuminated environment and recording a second video with a front-facing camera of the mobile computing device in the illuminated environment; extracting a plurality of lighting environment images from the first video; extracting a plurality of face images from the second video that include the user's face; processing the face images and the lighting environment images to obtain a plurality of determinations of a skin tone of the face; and combining the plurality of determinations of the skin tone of the face to determine a combined determination of the skin tone of the face.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

There are certain types of products for which an in-person experience has been difficult to replace with an online interaction. For example, beauty products such as foundation or other makeup products are difficult to browse online and difficult to recommend in an automated manner. This is primarily because skin tone is difficult to estimate in an automated way. Although it possible to capture an image or video of the consumer, it is difficult to ensure that such images can be reliably used determine skin tone. First, it is difficult to instruct a consumer how to capture such images in an accurate way that is also easy for the consumer. Second, even if consumers are successfully instructed in how to accurately capture such images, variable lighting conditions in the consumer's environment often lead to inaccurate estimation of skin tone. What is desired are techniques that can overcome these technical limitations in order to accurately estimate skin tone regardless of lighting conditions.

In some embodiments of the present disclosure, one or more machine learning models are trained to accurately estimate skin tone in images regardless of the lighting conditions. In some embodiments, the models can then be used to estimate a skin tone in a new image, and that estimated skin tone can be used for a variety of purposes. For example, the skin tone may be used to generate a recommendation for a foundation shade that accurately matches the skin tone, or a recommendation for another cosmetic product that is complimentary with the estimated skin tone.

In some embodiments, a computer system uses video recorded by multiple cameras to automatically estimate skin tone using one or more machine learning models, as described in further detail below. Thus, the need for an in-person test of the product is eliminated, and the ability of a computer system to automatically determine skin tone from images captured by ordinary consumers without photography skills or technical expertise is significantly improved.

Figure 1:
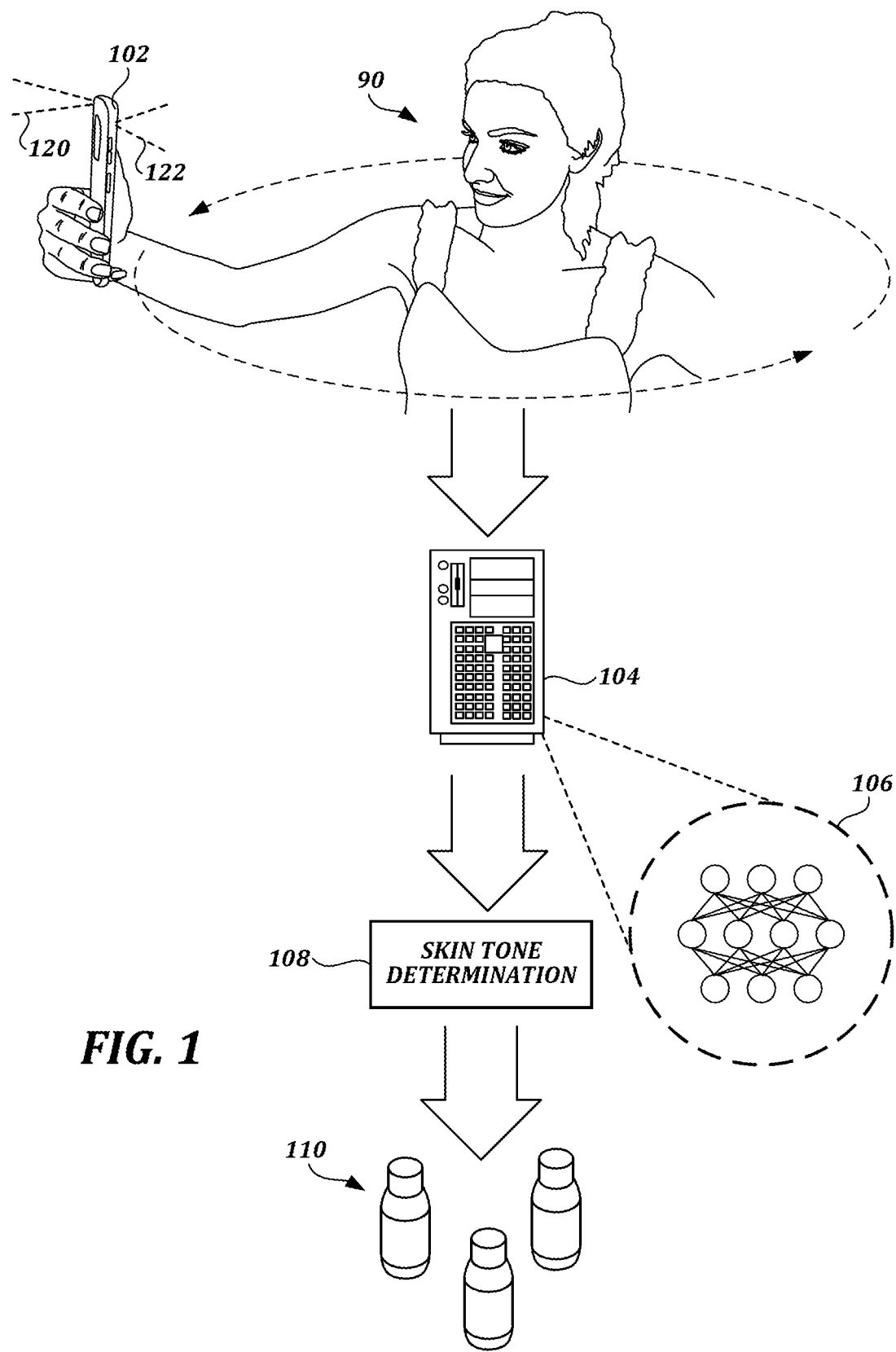
FIG. 1 is a schematic illustration of a non-limiting example embodiment of a system that uses video recorded by multiple cameras to automatically estimate skin tone according to various aspects of the present disclosure.

FIG. 1 is a schematic illustration of a non-limiting example embodiment of a system that generates automatic estimations of skin tone according to various aspects of the present disclosure. As shown, a user 90 has a mobile computing device 102. The user 90 captures a first video with a rear-facing camera and a second video with a forward-facing camera in an illuminated environment (e.g., in a room with artificial or natural lighting). The rear-facing camera has a field of view 120 that faces away from the user 90, and the forward-facing camera (sometimes referred to as a "selfie" camera) has a field of view 122 that is directed toward the user 90.

The mobile computing device 90 transmits the first video and the second video to a skin tone determination device 104. In some embodiments, the skin tone determination device 104 uses one or more machine learning models 106 to make a skin tone determination 108 based on the images in the videos. In some embodiments, the skin tone 108 may then be used to make recommendations of one or more products 110 that would complement or otherwise be appropriate for the skin tone 108.

In order to accurately estimate skin tone, the system obtains face images of the user in different lighting conditions. Lighting conditions may be changed by moving the mobile computing device 102 while capturing the video. In some embodiments, different lighting conditions are obtained by instructing the user 90 to turn around while recording a self-portrait or "selfie" video with the mobile computing device 102. As the user turns, the orientation of the user's face changes relative to nearby light sources, and individual frames of the video capture the user's face in these different lighting conditions.

However, in a typical "selfie video" usage scenario, the user 90 is presented with a preview of that video via the display of the mobile computing device 102. This presentation can be distracting and may cause the user 90 to change her facial expression, turn her head from side to side, or tilt her head forward or back. These types of movements or changes in expression can make it difficult for the system to determine a true skin tone, even in well-controlled lighting environments. Such movements can create shadows or other effects that may be present in some frames but absent or altered in other frames. Facial features may appear and disappear within the frame as the user's head moves. In addition, such movements may affect the accuracy of face detection technology, which may be used to ensure that the face of the user 90 stays in the field of view of the front-facing camera, or to normalize extracted frames of the video, such as by centering the user's face in the frame. In such scenarios, if the user 90 moves her head, e.g., such that both eyes are not clearly visible, face detection or image normalization processes may be adversely affected.

To reduce the likelihood of such problems, in some embodiments, the system instructs the user 90 to record a panoramic image using the rear-facing camera while also recording the user's face with the forward-facing camera. The system directs the user 90 to hold the mobile computing device 102 level while turning slowly in place. This approach directs the focus of the user 90 to accurately capturing the panorama image, rather than a selfie video. The typical "preview" image of the "selfie" video is also omitted from the display of the mobile computing device 102. By redirecting the user's focus and removing distractions, the user is more likely to maintain a neutral expression and head orientation and keep the camera in a good position to capture more accurate and consistent face images being with the forward-facing camera.

In the example shown in FIG. 1, the user 90 spins in place while holding the mobile computing device 102 in a "selfie" position in order to change the lighting conditions experienced. As shown, the user holds the mobile computing device 102 at a distance sufficient to allow the user's face to be fully captured by the forward-facing camera, while also capturing the panoramic image video with the rear-facing camera.

In addition to encouraging the user 90 to maintain a steady head and neutral facial expression, this approach allows lighting conditions to be measured from multiple perspectives by multiple cameras, without any further effort by the user. By measuring different lighting conditions in this way, the machine learning model 106 is provided with additional input to improve the accuracy of individual skin tone estimations, which can then be averaged or otherwise combined to further improve the accuracy of the overall skin tone determination 108.

In some embodiments, a first machine learning model is trained to take images extracted from video (e.g., face images and lighting environment images) as input and to generate lighting condition information as output. In some embodiments, the lighting condition information generated by the first machine learning model as output includes an estimated illuminant (light source) color. In some embodiments, the illuminant color for a face image is estimated by predicting an illuminant color from image information in the face image, predicting an illuminant color in a corresponding lighting environment image that was captured at the same time as the face image, and then averaging or otherwise combining those predicted illuminant colors. In this way, the prediction of the illuminant color may be made more accurate for a given face image than if only the face image itself (from a single camera, such as a forward-facing camera) were used. Lighting condition information also may include information other than color, such as a predicted intensity or direction of a light source.

Once the lighting condition information has been generated, the corresponding face image can be adjusted to account for the color of the light source (or multiple light sources) in the lighting environment. This helps to ensure that the system can estimate skin tone accurately in everyday lighting environments, where the color, intensity, and positioning of light sources will vary depending on the user's location. For example, if the system determines that the lighting environment includes a light source having a yellow color, the system can adjust the corresponding face image to account for the particular yellow color of the light source and thereby avoid inaccurately estimating the skin tone as being more yellow than it would appear under a white light source.

In some embodiments, a second machine learning model is trained to take the extracted face images and corresponding lighting condition information as input, and to output an estimated skin tone. In other embodiments, a single machine learning model may be trained to take extracted images as input and to output an estimated skin tone. Using the first machine learning model and second machine learning model may be beneficial in that the lighting condition information can be used to correct the presented color of the image or to detect the colors of other objects in the image, while using the single machine learning model may be beneficial in terms of reducing training time and complexity.

In some embodiments, the machine learning models may be neural networks, including but not limited to feedforward neural networks, convolutional neural networks (CNNs), recurrent neural networks, and generative adversarial networks (GANs). In some embodiments, any suitable training technique may be used, including but not limited to gradient descent, which may include stochastic, batch, and mini-batch gradient descent.

Figure 2:
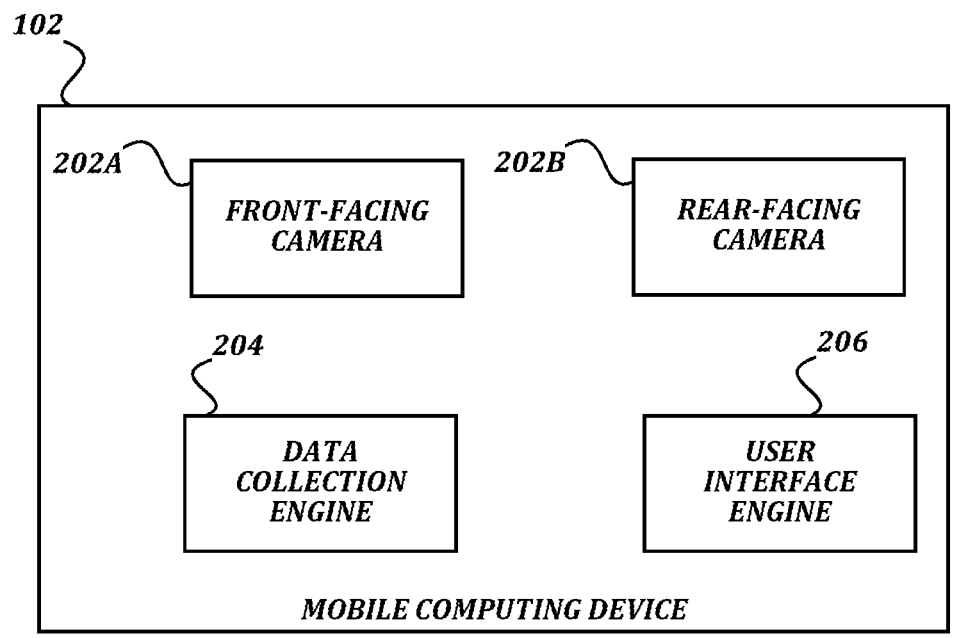
FIG. 2 is a block diagram that illustrates non-limiting example embodiments of a mobile computing device and a skin tone determination device according to various aspects of the present disclosure.
Figure 2:
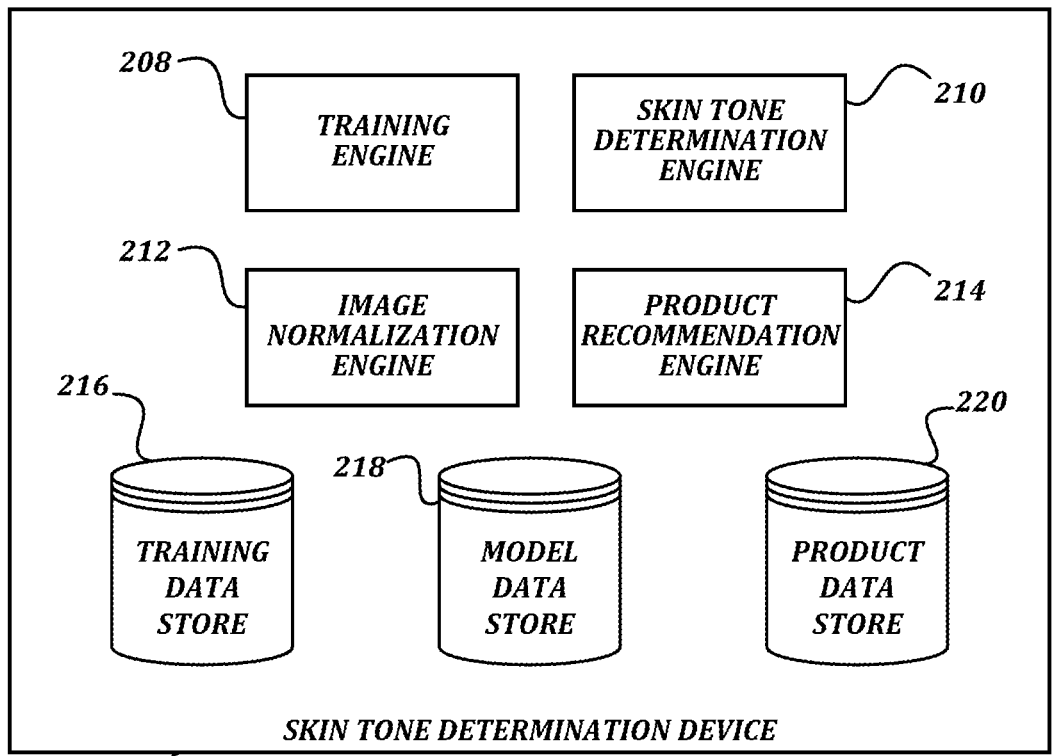

FIG. 2 is a block diagram that illustrates non-limiting example embodiments of a mobile computing device and a skin tone determination device according to various aspects of the present disclosure. As discussed above, the mobile computing device 102 is used to capture video of a user 90 using a forward-facing camera from which face images are extracted and additional video using a rear-facing camera from which lighting environment images are extracted. The mobile computing device 102 transmits the video data to the skin tone determination device 104 for determining a skin tone of the user 90. The mobile computing device 102 and the skin tone determination device 104 may communicate using any suitable communication technology, such as wireless communication technologies including but not limited to Wi-Fi, Wi-MAX, Bluetooth, 2G, 3G, 4G, 5G, and LTE: or wired communication technologies including but not limited to Ethernet, FireWire, and USB. In some embodiments, the communication between the mobile computing device 102 and the skin tone determination device 104 may occur at least in part over the Internet.

In some embodiments, the mobile computing device 102 is a smartphone, a tablet computing device, or another computing device having at least the illustrated components. In the illustrated embodiment, the mobile computing device 102 includes a front-facing camera 202A, a rear-facing camera 202B, a data collection engine 204, and a user interface engine 206.

In some embodiments, the data collection engine 204 is configured to obtain video captured by the front-facing camera 202A and extract face images of the user 90 from that video, and to obtain video captured by the rear-facing camera 202B and extract lighting environment images from that video. The data collection engine 204 also may be configured to capture training images for training the machine learning model 106.

In some embodiments, the user interface engine 206 is configured to present a user interface for capturing the video data from which the face images and lighting environment images are extracted. In some embodiments, the user interface engine 206 uses a graphical user interface (GUI), a voice interface, or some other interface design to guide the user in capturing video, while omitting the typical "selfie preview" mode in favor of a panoramic image capture interface. In some embodiments, the panoramic image capture interface includes one or more graphical guides to assist the user 90 in capturing video and keeping the rear-facing camera (and, in turn, the front-facing camera) steady during video capture. Such features include, in some embodiments, a horizontal guide line and progress bar.

Figure 3:
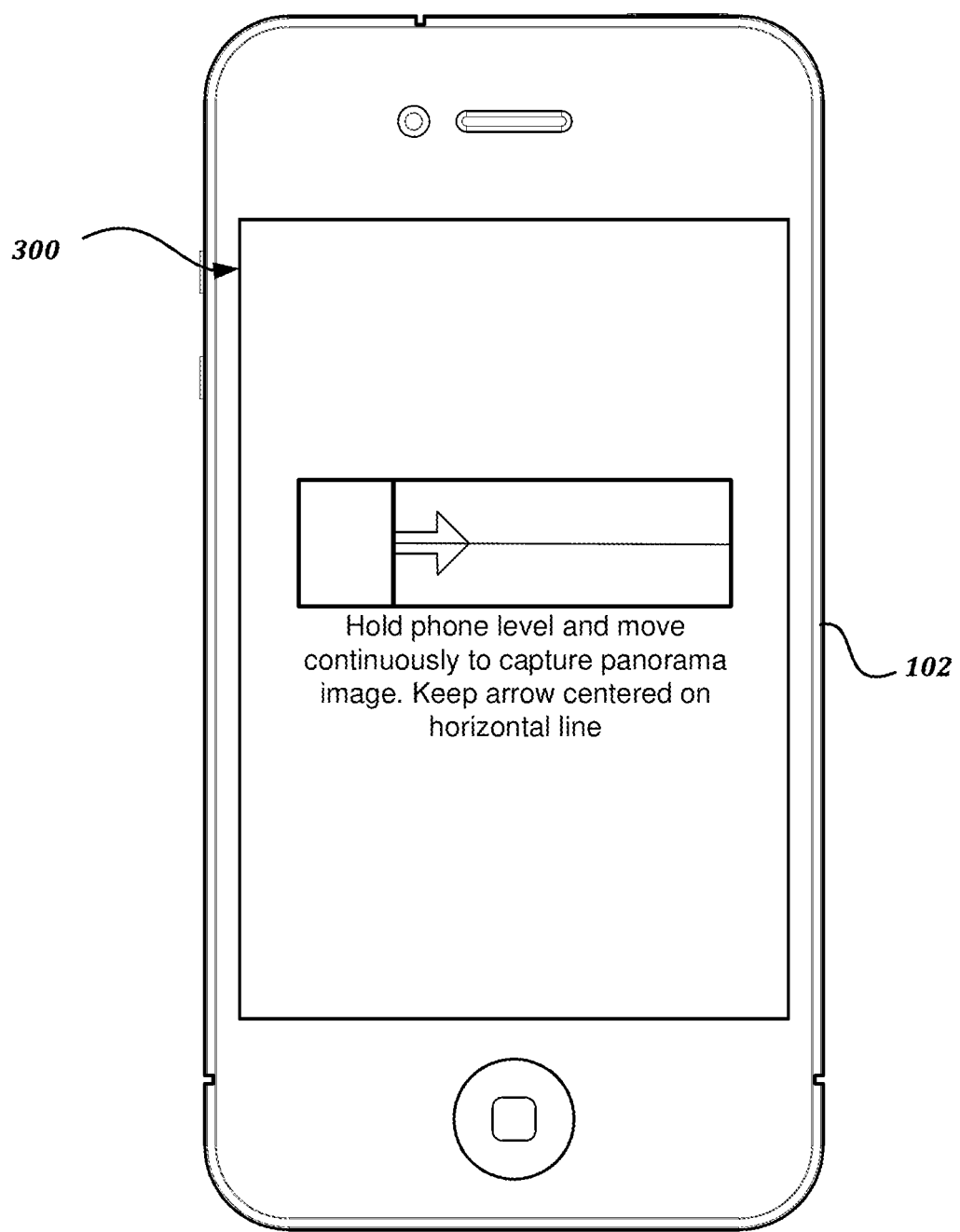
FIG. 3 is a schematic drawing that illustrates a non-limiting example embodiment of a user interface instructing a user to record a first video with a rear-facing camera having a first field of view while a second video is recorded by a front-facing camera having a second field of view directed toward a face of a live subject according to various aspects of the present disclosure.

FIG. 3 is a schematic drawing that illustrates a non-limiting example embodiment of presentation of a graphical user interface according to various aspects of the present disclosure. As shown, the mobile computing device 102 displays a graphical user interface 300 that includes instructions to capture a panoramic image as well as a graphical guides to assist the user in capturing video and keeping the rear-facing camera (and, in turn, the front-facing camera) steady during video capture. In the example shown, the user is instructed to hold the mobile computing device 102 level and move continuously to capture the panoramic image. The user is instructed to keep the graphical arrow centered on the horizontal line during this movement. In some embodiments, the movement and positioning of the graphical arrow depends on data received from sensors such as accelerometers and gyroscopes of the mobile computing device 102, which are used to detect movement and orientation of the mobile computing device 102. In some embodiments, as video is captured, the graphical arrow proceeds along the horizontal line. In some embodiments, progress of the graphical arrow along the horizontal line depends at least in part on a number of suitable images extracted from the video. For example, the graphical arrow is moved to the end of line (or otherwise moved or altered to indicate that the process is complete) when a predetermined number of images (e.g., 6, 10, etc.) suitable for use in the image processing stage have been extracted. Illustrative techniques for determining whether images are suitable for use are described below.

Referring again to FIG. 2, in some embodiments, the skin tone determination device 104 is a desktop computing device, a server computing device, a cloud computing device, or another computing device that provides the illustrated components. In the illustrated embodiment, the skin tone determination device 104 includes a training engine 208, a skin tone determination engine 210, an image normalization engine 212, a product recommendation engine 214. In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

As shown, the skin tone determination device 104 also includes a training data store 216, a model data store 218, and a product data store 220. As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

In some embodiments, the training engine 208 is configured to access training data stored in the training data store 216 and to use the training data to generate one or more machine learning models. The training engine 208 may store the generated machine learning models in the model data store 218. In some embodiments, the skin tone determination engine 210 is configured to use one or more machine learning models stored in the model data store 218 to process images in order to estimate a skin tone depicted in the images. In some embodiments, the image normalization engine 212 is configured to pre-process images before they are provided to the training engine 208 or the skin tone determination engine 210 in order to improve the accuracy of the determinations made. In some embodiments, the product recommendation engine 214 is configured to recommend one or more products stored in the product data store 220 based on a determined skin tone.

Figure 4:
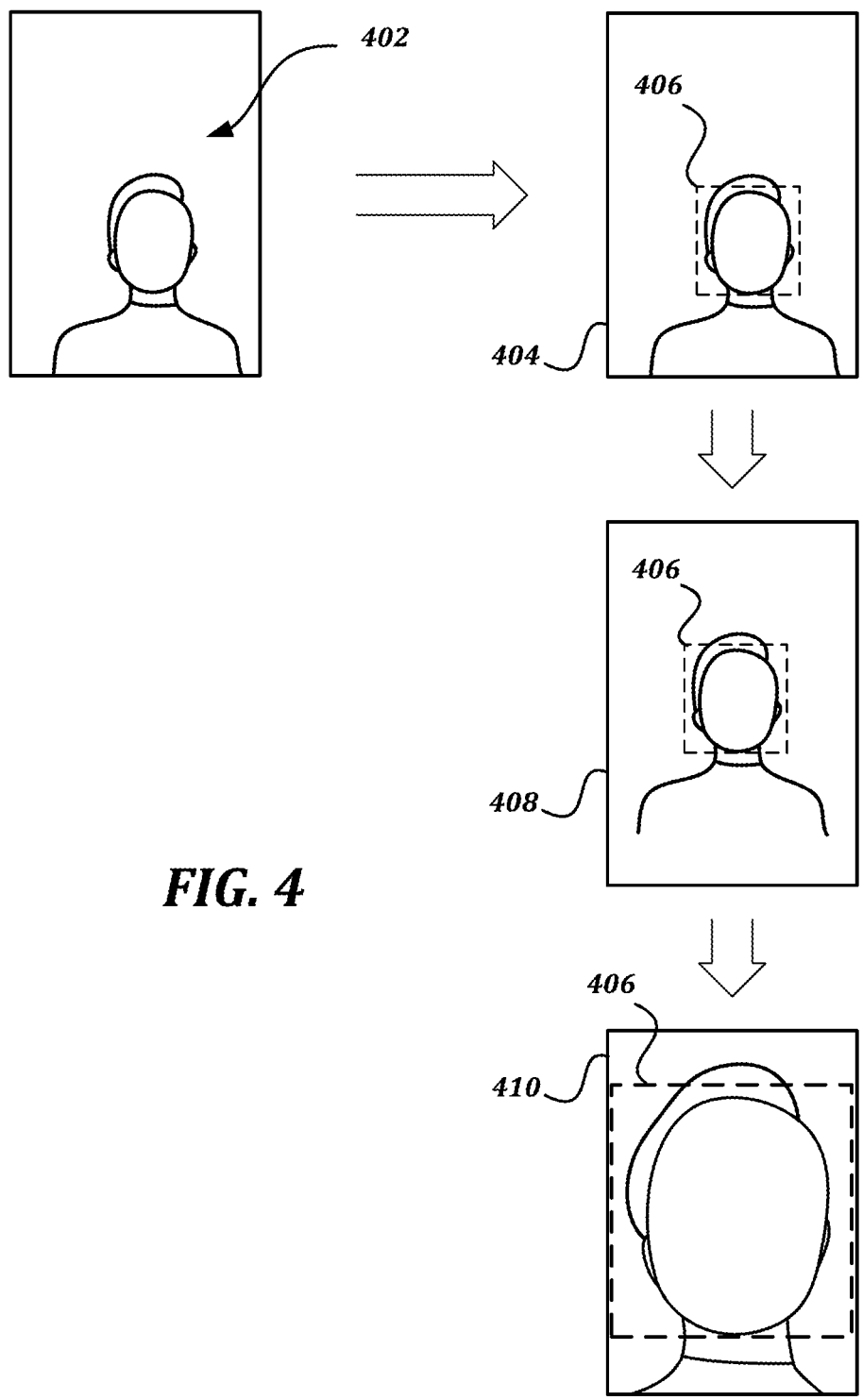
FIG. 4 is a schematic drawing that illustrates a non-limiting example embodiment of normalization of an image that includes a face according to various aspects of the present disclosure.

FIG. 4 is a schematic drawing that illustrates a non-limiting example embodiment of normalization of an image that includes a face according to various aspects of the present disclosure. As shown, an image 402 includes an off-center face that takes up only a small portion of the overall image 402. As such, it may be difficult to estimate a skin tone based on the image 402. It may be desirable to reduce the amount of non-face area in the image, and to place the face area of the image in a consistent location.

In a first normalization action 404, the image normalization engine 212 uses a face detection algorithm to detect the portion of the image 404 that depicts the face. The image normalization engine 212 may use the face detection algorithm to find a bounding box 406 that includes the face. In a second normalization action 408, the image normalization engine 212 may alter the image 408 to center the bounding box 406 within the image 408. In a third normalization action 410, the image normalization engine 212 may zoom the image 410 to cause the bounding box 406 to be as large as possible within the image 410. By conducting the normalization actions, the image normalization engine 212 can reduce differences in layout and size between multiple images, and can therefore improve the training and accuracy of the machine learning model as well as the accuracy of results when applying new images to the machine learning model. In some embodiments, different normalization actions may occur. For example, in some embodiments, instead of centering and zooming the bounding box 406, the image normalization engine 212 may crop the image to the bounding box 406. As another example, in some embodiments, the image normalization engine 212 may reduce or increase the bit depth, or may undersample or oversample the pixels of the image in order to match other images collected by different cameras 202 or different mobile computing devices 102.

In some embodiments, the normalization process and machine learning models described herein may be customized to a particular types of mobile computing devices 102 or cameras 202A, 202B used to collect training images or images of the live subject. In some embodiments, differences between captured images may be minimized during normalization.

Although FIG. 2 illustrates various components as being provided by the mobile computing device 102 or the skin tone determination device 104, in some embodiments, the layout of the components may be different. For example, in some embodiments, the skin tone determination engine 210 and model data store 218 may be present on the mobile computing device 102 so that the mobile computing device 102 can determine skin tones in images captured by the front-facing camera 202A without transmitting the images to the skin tone determination device 104. As another example, in some embodiments, all of the components may be provided by a single computing device. As yet another example, in some embodiments, multiple computing devices may work together to provide the functionality illustrated as being provided by the skin tone determination device 104.

Figure 5:
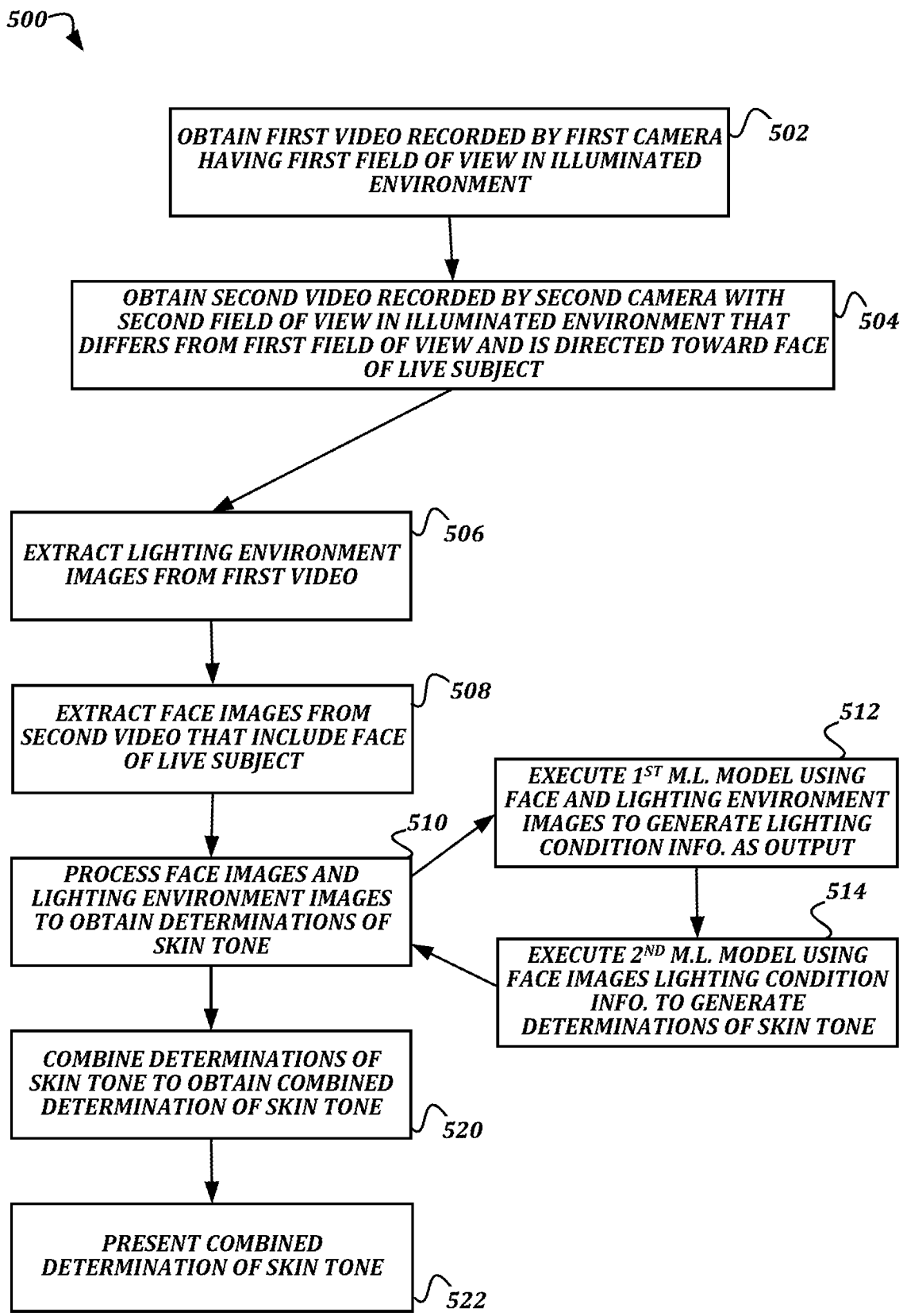
FIG. 5 is a flowchart that illustrates a non-limiting example embodiment of a method of using video recorded by multiple cameras to automatically estimate skin tone according to various aspects of the present disclosure.

FIG. 5 is a flowchart that illustrates a non-limiting example embodiment of a method of using images extracted from multiple camera views to estimate a skin tone of the face of a live subject in an image according to various aspects of the present disclosure. The subject is referred to as a "live subject" in method 500 in order to distinguish the subject from training subjects that may be used in a process of training machine learning models that may be used in the method 500. While ground truth skin tone information is available for training subjects, such information is not available for the live subject.

At block 502, a computing device obtains a first video recorded by a first camera having a first field of view in an illuminated environment. In some embodiments, a data collection engine 204 of a mobile computing device 102 (e.g., an Apple iphone 14) uses a rear-facing camera 202B of the mobile computing device 102 to capture video of the environment in which the live subject is located. At block 504, the computing device obtains a second video recorded by a second camera having a second field of view in the illuminated environment. The second field of view differs from the first field of view, and is directed toward the face of the live subject. In some embodiments, the data collection engine 204 of the mobile computing device 102 uses a forward-facing camera 202A of the mobile computing device 102 to capture video of the face of the live subject. In some embodiments, the two videos may start and stop recording simultaneously or otherwise cover the same or substantially the same time period. This allows the lighting environment images to be more relevant to lighting conditions that exist when face images are extracted.

At block 506, the computing device extracts lighting environment images from the first video, and at block 508, the computing device extracts face images from the second video that include the face of the live subject. In some embodiments, individual face images are paired with corresponding lighting environment images from the same or substantially the same time instance. In some embodiments, the extracting of the face images comprises one or more preprocessing steps in which frames of the second video are evaluated for suitability as face images in further processing steps. In an illustrative scenario, the computing device measures a brightness level for each frame and omits the frame from the extracted face images where the measured brightness level is less than a minimum threshold brightness level or greater than a maximum threshold brightness level. Alternatively or additionally, other suitability evaluations can be performed, such as confirming the presence of the full face in the frame, or checking for blurring or other image quality problems. In some embodiments, data collection engine 204 transmits the extracted images to the skin tone determination device 104 for further processing.

At block 510, the computing device processes the extracted face images and lighting environment images to obtain determinations of skin tone of the face of the live subject. In some embodiments, the computing device performs normalization of images as part of step 510. In some embodiments, the normalization actions illustrated in FIG. 4 may be applied to the face images.

In some embodiments, processing the face images and the lighting environment images includes executing at least one machine learning model using the face images and the lighting environment images as input to generate the determinations of skin tone of the face as output. In the example shown in FIG. 5, at block 512 the computing device executes a first machine learning model using the face images and the lighting environment images as input to generate lighting condition information for each of the face images as output, and at block 514 the computing device executes a second machine learning model using the face images and the corresponding lighting condition information as input to generate the determinations of skin tone of the face as output. In some embodiments, the lighting condition information includes an illuminant color.

At block 520, the computing device combines individual determinations of skin tone to obtain a combined determination of the skin tone of the live subject. In some embodiments, the estimated skin tones for the normalized images may be averaged or otherwise combined to generate a final skin tone determination.

In some embodiments, the determinations of skin tone are evaluated for suitability in further processing steps before being combined to obtain the combined determination of skin tone. In an illustrative scenario, the determinations of skin tone each include a corresponding confidence level. The confidence levels may be generated by a machine learning model for individual determinations of skin tone. The computing device compares the corresponding confidence level with a threshold confidence level and omits or gives less weight to the corresponding determination of skin tone in the combining step where the corresponding confidence level is less than the threshold confidence level.

At block 512, the computing device presents the combined determination of the skin tone. In some embodiments, the skin tone determination engine 210 transmits the combined determination of the skin tone to the mobile computing device 102. In some embodiments, the user interface engine 206 may present a category, classification, numeric value, or other indication of the skin tone to the user. In some embodiments, the user interface engine 206 may recreate the color for presentation to the user on a display of the mobile computing device 102.

In some embodiments, a product recommendation engine 214 of the skin tone determination device 104 determines one or more products to recommend based on the skin tone. The user interface engine 206 may then present representations of such products to the user, and may allow the user to purchase or otherwise obtain the products.

In some embodiments, the product recommendation engine 214 may determine one or more products in the product data store 220 that match the determined skin tone. This may be particularly useful for products such as foundation that are intended to match the skin tone of the user. In some embodiments, the product recommendation engine 214 may determine one or more products in the product data store 220 that complement the skin tone but do not match the skin tone. This may be particularly useful for products such as eye shadow or lip colors where matching the skin tone exactly is less desirable. In some embodiments, the product recommendation engine 214 may use a separate machine learning model, such as a recommender system, to determine a product from the product data store 220 based on products preferred by other users with a matching or similar skin tone. In some embodiments, if an existing product does not match the skin tone, the product recommendation engine 214 may determine ingredients for creating a product that would match the skin tone, and may provide the ingredients to a compounding system for creating a custom product that would match the skin tone.

Figure 6:
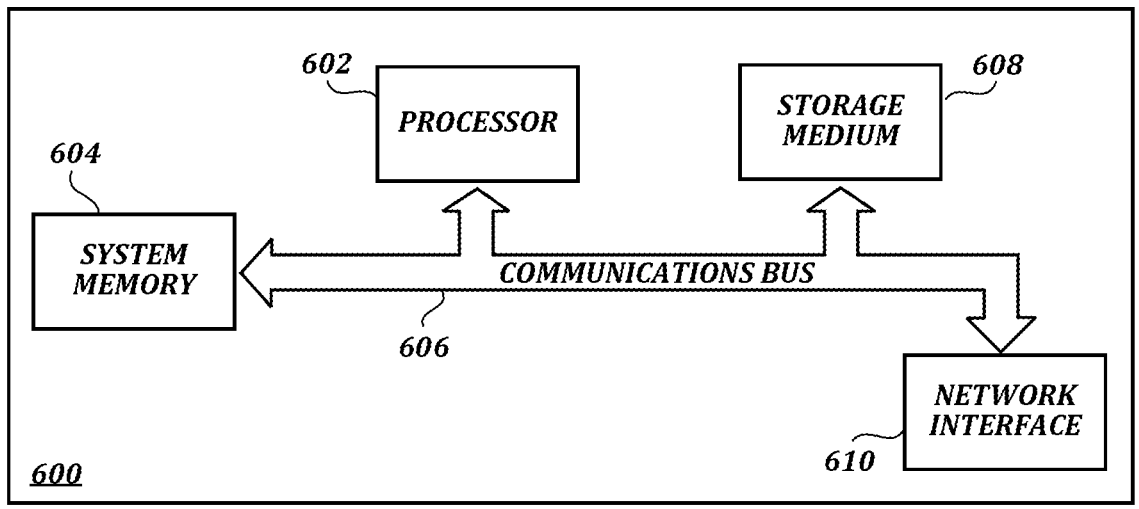
FIG. 6 is a block diagram of an illustrative computing device appropriate for use as a computing device of the present disclosure.

FIG. 6 is a block diagram that illustrates aspects of an exemplary computing device 600 appropriate for use as a computing device of the present disclosure. While multiple different types of computing devices were discussed above, the exemplary computing device 600 describes various elements that are common to many different types of computing devices. While FIG. 6 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, 4G, LTE, 5G, WiMAX, Bluetooth, Bluetooth low energy, and/or the like. As will be appreciated by one of ordinary skill in the art, the network interface 610 illustrated in FIG. 6 may represent one or more wireless interfaces or physical communication interfaces described and illustrated above with respect to particular components of the system 100.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 604 and storage medium 608 depicted in FIG. 6 are examples of computer-readable media.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include input devices, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, Bluetooth low energy, USB, or other suitable connections protocols using wireless or physical connections. Similarly, the computing device 600 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention. For example, while embodiments described above train and use models to estimate skin tone, in some embodiments, skin features other than skin tone may be estimated. For instance, in some embodiments, one or more machine learning models may be trained to estimate a Fitzpatrick skin type using techniques similar to those discussed above with respect to skin tone, and such models may then be used to estimate Fitzpatrick skin types for images of live subjects.

The embodiments of the invention in which an exclusive property or privilege is claimed are defined as follows:

1. A method of estimating skin tone based on face images, the method comprising:
   obtaining, by a computing device, a first video recorded by a first camera having a first field of view in an illuminated environment;
   obtaining, by the computing device, a second video recorded by a second camera having a second field of view in the illuminated environment that differs from the first field of view, wherein the second field of view is directed toward a face of a live subject;
   extracting, by the computing device, a plurality of lighting environment images from the first video;
   extracting, by the computing device, a plurality of face images from the second video that include the face of the live subject;
   processing, by the computing device, the face images and the lighting environment images to obtain a plurality of determinations of skin tone of the face;
   combining, by the computing device, the determinations of skin tone of the face to determine a combined determination of skin tone; and
   presenting, by the computing device, the combined determination of skin tone.

2. The method of claim 1 further comprising constructing a panoramic image from the first video.

3. The method of claim 1, wherein processing the face images and the lighting environment images includes executing at least one machine learning model using the face images and the lighting environment images as input to generate the determinations of skin tone of the face as output.

4. The method of claim 3 wherein executing the at least one machine learning model includes:
   executing a first machine learning model using the face images and the lighting environment images as input to generate lighting condition information for each of the face images as output; and
   executing a second machine learning model using the face images and the corresponding lighting condition information as input to generate the determinations of skin tone of the face as output.

5. The method of claim 4, wherein the lighting condition information comprises an illuminant color.

6. The method of claim 4, wherein the determinations of skin tone each include a corresponding confidence level.

7. The method of claim 6 further comprising:
   comparing the corresponding confidence level with a threshold confidence level; and
   omitting the determination of skin tone from the combining step where the corresponding confidence level is less than the threshold confidence level.

8. The method of claim 1, wherein extracting the face images from the second video comprises, for individual frames of the second video:
   measuring a brightness level of the frame; and
   omitting the frame from the extracted face images where the measured brightness level is less than a minimum threshold brightness level or greater than a maximum threshold brightness level.

9. The method of claim 1, wherein the first video is recorded at the same time as the second video.

10. A system, comprising:
a skin tone estimation unit including computational circuitry configured to:
obtain a first video recorded by a first camera having a first field of view in an illuminated environment;
obtain a second video recorded by a second camera having a second field of view in the illuminated environment that differs from the first field of view, wherein the second field of view is directed toward a face of a live subject;
extract a plurality of lighting environment images from the first video;
extract a plurality of face images from the second video that include the face of the live subject;
process the face images and the lighting environment images to obtain a plurality of determinations of skin tone of the face;
combine the determinations of skin tone of the face to determine a combined determination of skin tone of the face; and
present the combined determination of the skin tone of the face.

11. The system of claim 10, wherein the first camera is a rear-facing camera, and wherein the computational circuitry is further configured to construct a panoramic image from the first video.

12. The system of claim 10, wherein the computational circuitry is further configured to execute at least one machine learning model using the face images and the lighting environment images as input to generate the determinations of skin tone of the face as output.

13. The system of claim 10, wherein the computational circuitry is further configured to:
execute a first machine learning model using the face images and the lighting environment images as input to generate lighting condition information for each of the face images as output; and
execute a second machine learning model using the face images and the corresponding lighting condition information as input to generate the determinations of skin tone of the face as output.

14. The system of claim 13, wherein the lighting condition information comprises an illuminant color.

15. The system of claim 13, wherein the determinations of skin tone each include a corresponding confidence level.

16. The system of claim 15, wherein the computational circuitry is further configured to combine the determinations of skin tone of the face to determine a combined determination of skin tone by, for each of the determinations of skin tone:
comparing the corresponding confidence level with a threshold confidence level; and
omitting the determination of skin tone from the combining step where the corresponding confidence level is less than the threshold confidence level.

17. The system of claim 10, wherein the computational circuitry is further configured to, for individual frames of the second video:
measure a brightness level of the frame; and
omit the frame from the extracted face images where the measured brightness level is less than a minimum threshold brightness level or greater than a maximum threshold brightness level.

18. A non-transitory computer-readable medium having computer-executable instructions stored thereon that, in response to execution by one or more processors of a computer system, cause the computer system to perform actions comprising:
presenting a user interface on a mobile computing device instructing a user to capture a panoramic image in an illuminated environment;
responsive to user input via the user interface, recording a first video with a rear-facing camera of the mobile computing device in the illuminated environment and recording a second video with a front-facing camera of the mobile computing device in the illuminated environment;
extracting a plurality of lighting environment images from the first video;
extracting a plurality of face images from the second video that include the user's face;
processing the face images and the lighting environment images to obtain a plurality of determinations of a skin tone of the face; and
combining the plurality of determinations of the skin tone of the face to determine a combined determination of the skin tone of the face.

19. The non-transitory computer-readable medium of claim 18, wherein processing the face images and the lighting environment images includes:
executing, by the computing device, a first machine learning model using the face images and the lighting environment images as input to generate lighting condition information for each of the face images as output; and
executing, by the computing device, a second machine learning model using the face images and the corresponding lighting condition information as input to generate the determinations of skin tone of the face as output.

20. The non-transitory computer-readable medium of claim 19, wherein the lighting condition information comprises an illuminant color.

* * * * *

UNITED STATES PATENT AND TRADEMARK OFFICE
CERTIFICATE OF CORRECTION

Page 1 of 1

PATENT NO. : 12,394,098 B2
APPLICATION NO. : 18/154669
DATED : August 19, 2025
INVENTOR(S) : Grégoire Charraud et al.

It is certified that error appears in the above-identified patent and that said Letters Patent is hereby corrected as shown below:

In the Claims

| Column | Line | |
|---|---|---|
| 13 | 5 | Claim 10, delete "to;" and insert -- to: -- |

Signed and Sealed this
Sixteenth Day of December, 2025

John A. Squires
*Director of the United States Patent and Trademark Office*